April 13, 1943.    A. E. JURS    2,316,649
RELIEF VALVE
Filed April 16, 1940    2 Sheets-Sheet 1
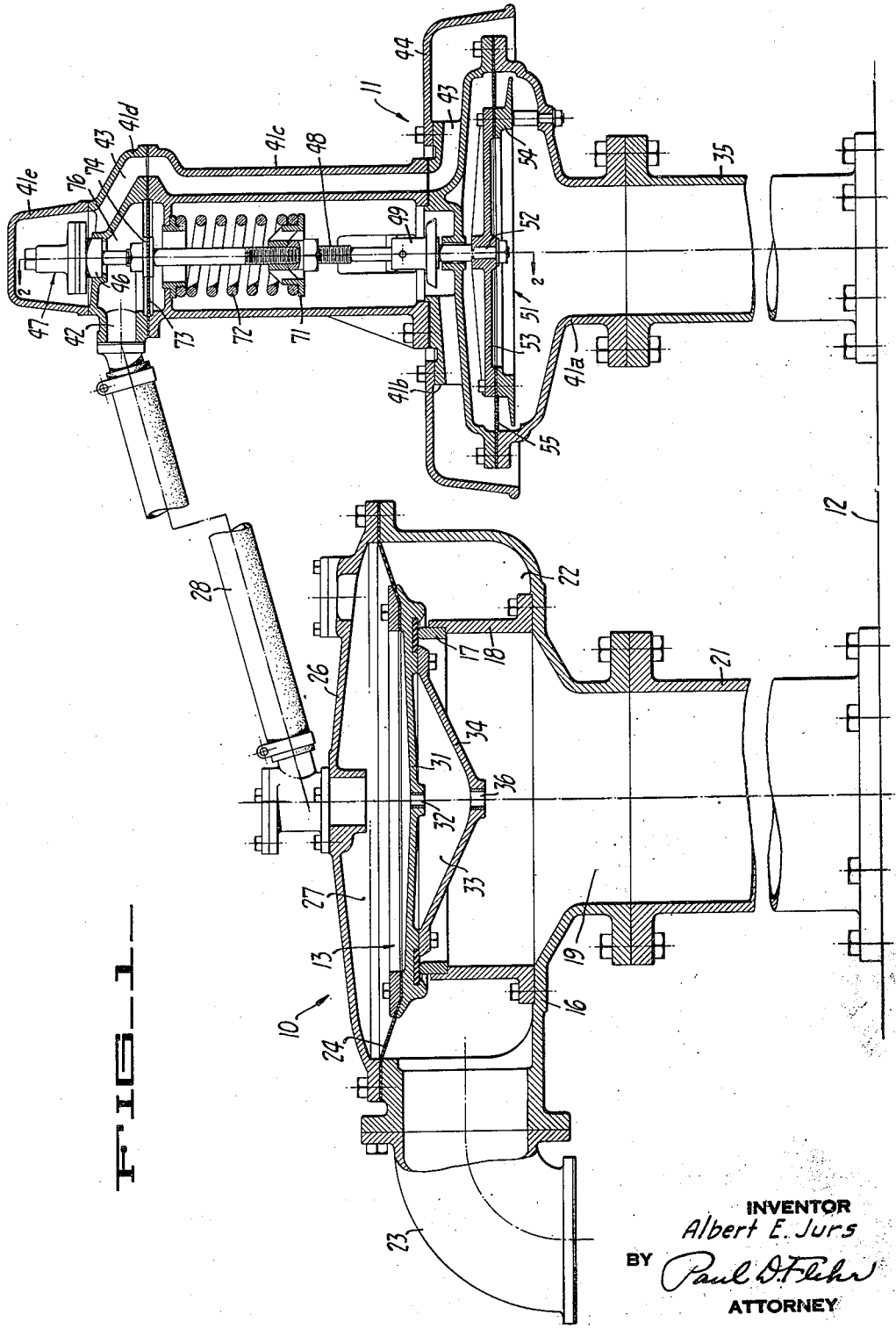
FIG_1
INVENTOR
Albert E. Jurs
BY
Paul D. Flehr
ATTORNEY

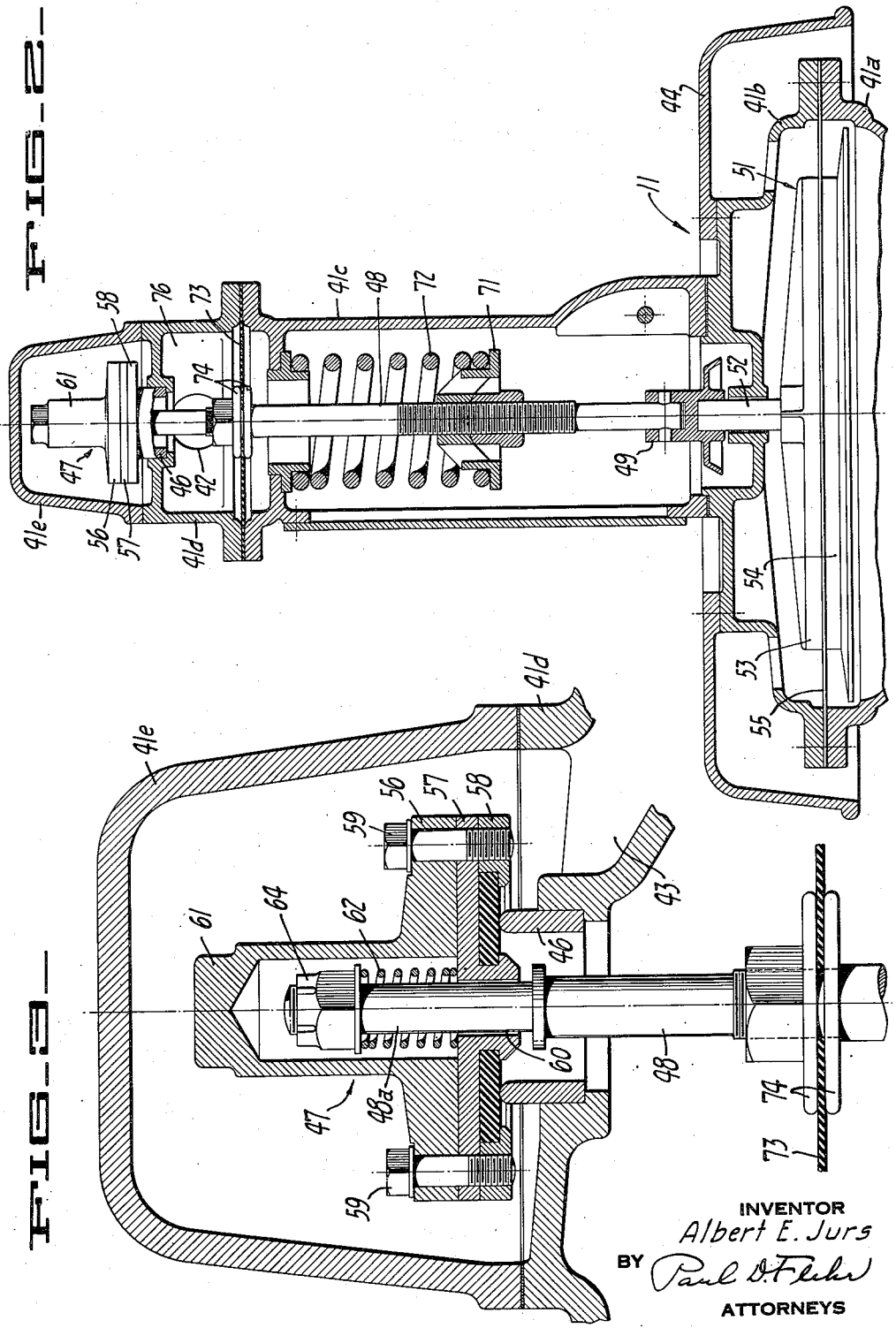

Patented Apr. 13, 1943

2,316,649

UNITED STATES PATENT OFFICE 2,316,649

RELIEF VALVE

Albert E. Jurs, Piedmont, Calif.

Application April 16, 1940, Serial No. 329,927

7 Claims. (Cl. 137—53)

This invention relates generally to devices for controlling the flow of gases in accordance with gas pressures, such as commonly used in systems for automatically relieving gas or vapor pressures in storage tanks of the type employed for hydrocarbon products. In storage tanks for such volatile liquids abnormal vapor pressure within the tank must be relieved by venting of gas when the pressure attains a pre-determined value.

It is an object of the invention to provide an improved relief valve of the character referred to which effectively eliminates or minimizes vibration or chattering of the valve pallet.

Another object of the invention is to provide a relief valve of the character referred to which is especially useful for the storing of volatile liquids which are stored at relatively low vapor pressures.

Another object of the invention is to provide a relief valve of the character referred to in which the chattering or vibration incident to change of the pressure during the venting operation through the critical vibration range is accomplished quickly and expeditiously to avoid chattering or vibration.

Another object of the invention is to provide a gas flow relief valve in which the opening and closing phases of a venting operation are performed rapidly.

Other objects of the invention will be apparent from the following description of a preferred embodiment of the invention, as illustrated in the accompanying drawings, in which:

Figure 1 is a side elevational view, in crosssection, illustrating a relief valve incorporating the present invention.

Figure 2 is a sectional view through the pilot valve mechanism taken as indicated by the line 2—2 in Figure 1.

Figure 3 is an enlarged view of a part of the pilot valve mechanism, the view being taken in the same plane as Figure 1.

The apparatus as illustrated in Figure 1 includes a main valve mechanism 10, and a pilot valve mechanism 11, both of which are shown as installed in the top wall 12 of a storage tank.

The main valve mechanism 10 includes a main valve closure pallet indicated generally at 13 and which is described more specifically hereinafter. The pallet is positioned within the hollow body 16 and engages a seat ring 17 which is carried by an annular raised flange 18 in the body 16. The inlet opening 19 of the body is connected by conduit 21 to the upper tank wall 12. The annular space 22 which is provided around the flange 18 communicates through conduit 23 with the atmosphere or to some suitable vapor recovery system.

Clamped to the edge of the pallet or closure 13, there is provided an annular flexible diaphragm 24 which has it annular outer edge clamped between the main body 16 and a cover 26 suitably fastened thereon. The space 27 above the pallet 13 and the diaphragm 24 forms a gas chamber which is at all times in communication with the pilot valve mechanism through a conduit 28 for control of the opening and closing of the pallet 13 in a manner later described.

The pressure chamber 27 is also in communication with the inlet opening 19 of the relief valve through a supplementary pressure chamber as will now be described. As seen in Figure 1, the body portion 31 of the pallet 13 is slightly dished and is provided at its center with an orifice 32 through which the chamber 27 communicates with the supplementary pressure chamber 33 formed between the wall 31 of the pallet and the lower dished wall 34 secured to the wall 31 and having a central orifice 36 provided therein communicating with the inlet opening 19 of the relief valve. Both of orifices 32 and 36 may be provided with suitable insert liners.

The restricted opening from the inlet opening 19 through orifice 36, chamber 33, and orifice 32 to the pressure chamber 27 provides for building up of pressure in this chamber when the pallet is in engagement with the seat 17 to hold the pallet in closed position until the chamber 27 is vented to effect opening of the pallet.

Associated with the main valve mechanism 10 is a pilot valve mechanism 11 of special construction which also aids in controlling and eliminating the conditions of chattering and vibration. As seen in Figure 1, the pilot valve mechanism 11 is supported by conduit 35 from the top wall 12 of the tank and is provided with a casing composed of separate sections or parts 41a, 41b, 41c, 41d, and 41e. These parts are assembled and clamped together in a convenient manner to provide a housing for the various working parts. The body part 41d is provided with an inlet passage 42 communicating with the conduit or hose 28 and with a discharge passage 43 leading from within the part 41e and downwardly through the parts 41c and 41b to a discharge space provided under the protecting housing 44 and communicating with the atmosphere.

The body part 41d (Figures 1 and 3) also carries a valve seat 46 with which the pilot valve assembly 47 cooperates. The valve assembly 47 is carried at the upper end of an operating rod 48 which is connected at its lower end to a coupling sleeve 49 to which a diaphragm assembly 51 is connected by rod 52. The diaphragm 51 includes a central plate 53 and a lower ring 54 between which an annular diaphragm 55 is clamped to extend outwardly and have its outer edge clamped between the housing portions 41a and 41b. This diaphragm assembly is of the construction disclosed and claimed in my co-pending application, Serial No. 259,630, filed March 3, 1939.

The pilot valve assembly 47 illustrated in Figure 3 includes a plurality of circularly contoured parts 56, 57 and 58 which are clamped together by means of screws 59. The upper end 48a of the rod 48 is of reduced diameter and extends loosely through a central opening 60 in the part 57. The part 56 has a hollow extension 61 to house the upper rod portion 48a and also to house a compression spring 62. The lower end of this spring is seated upon the part 57 and its upper end bears upon the nut 64 whereby the force of the spring 62 serves to urge the valve 47 downwardly relative to the rod 48.

Intermediate its end, the rod 48 (Figure 2) carries a spring retainer ring 71 upon which a spring 72 is seated having its other end seated against a suitable collar carried by housing part 41c. Above the spring 72 and below the inlet 42, a diaphragm 73 is provided which is clamped between clamping collars 74 on the rod 48 and the housing sections 41c and 41d. This diaphragm 73 is subjected to the pressure in the chamber 76 which is transmitted through the inlet passage 42 and conduit 28 from the chamber 27 and serves with the spring 72 to urge the valve 47 downwardly against its seat against the pressure exerted on the diaphragm assembly 51.

The operation will be described briefly assuming the relief valve mechanism to be conditioned as shown in Figure 1 with the main pallet 13 closed and also with the pilot valve 47 closed. In this condition of the parts, pressure built up within the tank has been transmitted through the restricted orifice 36, the supplemental pressure chamber 33, the orifice 32, to the pressure chamber 27, and also through the conduit 28 and the inlet 42 into chamber 76 to be imposed upon the diaphragm 73 of the pilot valve mechanism.

When the pressure in the tank rises above the selected maximum pressure which is determined by the adjustment of the compression spring 72, the pressure transmitted to the diaphragm assembly 51 of the pilot valve becomes greater than the combined pressures exerted by the spring 72 and the pressure on the diaphragm 73, so that the pilot valve 47 starts to lift from its seat 46. When the pilot valve is lifted from its seat, a flow of gas begins from the chamber 76 through the valve 47 and passage 43, being vented to the atmosphere. The reduction in pressure in chamber 76 results in a sudden disappearance of the pressure exerted on the diaphragm 73, so that the pressure of the spring 72 alone opposed the pressure on the diaphragm assembly 51. As a result, the pilot valve 47, when once initially lifted from its seat, is moved rapidly to full open position so that a rapid reduction in pressure will occur in the chamber 76, the conduit 28, and the pressure chamber 27 of the main valve. As a result of the rapid venting of the gas from pressure chamber 27, the pressure therein is reduced rapidly, so that the gas pressure below the main pallet 13 can become effective quickly to lift the pallet 13 from its seat. This action is accomplished with sufficient rapidity so that the critical chattering range of pressure for pallet 13 is passed through with sufficient speed that no objectionable chattering will occur.

When the pressure in the tank is reduced sufficiently so that the spring 72 can become effective to again seat the pilot valve 47 and thereby close the vent passage from the pressure chamber 27, a reverse operation occurs in that when the pilot valve begins to close the pressure is rapidly built up in the chamber 76 and in acting against the diaphragm 73 rapidly moves the pilot valve to its closed position. This correspondingly causes a rapid build up of pressure in the chamber 27 so that the critical pressure range during the closing movement of the main valve 13 is also passed through with sufficient rapidity to prevent objectionable vibration or chattering.

During the rapid venting of pressure from the pressure chamber 27, the amount of gas escaping into such chamber through the orifices 36 and 32 is insufficient to interfere with the rapid venting operation. At the same time the restrictions afforded by the orifices 36 and 32, together with the pressure zone interposed intermediate these orifices by the chamber 33 also assist in damping out and minimizing any chattering which may be present.

Also during the closing operation, the supplemental pressure chamber 33 and its two entrant orifices 32 and 36 provide for damping out or minimizing of the pallet vibrating conditions or pulsations in the conduit 21 caused by changing pressure conditions. Hence, the supplemental pressure chamber 33 serves as a pulsation absorbing means or eliminator and its volume is ample for this purpose.

For certain operating conditions, particularly when a conduit 21 of unusual length is employed in mounting the valve mechanism and where relatively low vapor pressures are present in the system, certain vibrating conditions or pulsations are set up in the column of air within the conduit 21. Such vibrations or pulsations tend to prevent closing of the pallet upon venting of the pressure chamber 27 and to set up a vibration or chattering of the pallet either on its seat or in open position, so that proper closing and sealing off of gas after lowering of the pressure for the desired amount is not effected. With the supplementary pressure chamber 33 and with the restricted orifices 36 and 32, with the orifice 36 larger in size, it is then found that such vibrations are substantially eliminated and are minimized to a great extent so as to not interfere with efficient operation of the valve.

In a typical installation where the overall diameter of the pallet structure including the diaphragm 24 would be in the neighborhood of 21 inches, the orifice 32 may have a diameter of, say, three-eighths of an inch, and the orifice 36, a diameter of, say, five-eighths of an inch.

In many installations such vibrations are substantially eliminated by the supplemental pressure chamber. In other installations of varying conditions, the pilot valve mechanism by virtue of its rapid opening and closing movements acts with the supplemental pressure chamber in controlling or minimizing chattering and vibration.

I claim:

1. In a gas relief valve, a body having inflow and outflow openings, a horizontal valve seat formed within the body, a rigid closure pallet cooperating with said valve seat, an annular flexible diaphragm connecting the periphery of said pallet to said body, means forming a pressure chamber above said closure pallet with one wall of said chamber provided by said pallet and said diaphragm, said chamber being adapted to be vented for causing lifting of the pallet from the seat, and means for establishing communication between said pressure chamber and said inflow opening including an auxiliary chamber formed in said pallet and having restricted communication with said first named pressure chamber and said inflow opening, said last named chamber being formed by upper and lower walls of the pallet with the lower wall being dished downwardly, said pallet in moving between closed and open positions being guided solely by said diaphragm.

2. In a gas relief valve, a body having inflow and outflow openings, a horizontally disposed annular valve seat within the body, a closure pallet disposed upon said seat and movable between open and closed positions with respect to the same, the lower side of the pallet being exposed to gas in said inflow opening, an annular flexible diaphragm connecting the periphery of the pallet to the body, and means forming a closed gas chamber over the pallet and the diaphragm, said chamber being adapted to be vented, said pallet comprising upper and lower downwardly dished walls affording a chamber between the same, each of said walls being provided with a restricted orifice in its lowermost portion.

3. In a relief valve, a body having inflow and outflow openings, a horizontal valve seat formed within the body, a movable closure pallet cooperating with the valve seat, an annular flexible diaphragm connecting the periphery of said pallet to said body, said pallet being capable of movement toward and away from said seat between closed and open positions and also being capable of cocking or tilting movement relative to the seat, said body being formed to afford a closed gas chamber extending over the pallet and said diaphragm, and damping means carried by the pallet and serving to minimize fluttering of the same on the seat, said means comprising a supplemental gas chamber carried by the pallet, flow restricting orifice means communicating between the supplemental chamber and the first named chamber, flow restricting orifice means communicating between the supplemental chamber and the inlet opening, said orifice means being spaced apart and the supplemental chamber forming a space for building up static gas pressure in the event of the formation a difference in static gas pressure between the inlet opening and the first named chamber, said space being of sufficient volume to serve as a pulsation absorbing chamber.

4. In a relief valve, a body having inflow and outflow openings, a horizontally disposed valve seat formed within the body, a movable closure pallet cooperating with the valve seat and movable in a vertical direction between open and closed positions, a flexible fluid operated diaphragm connected to operate the pallet and having its periphery sealed with respect to the body, said body being formed to afford a closed gas chamber above said diaphragm, means forming a supplemental gas chamber on said pallet, orifice means establishing flow restricting communication between said first named gas chamber and said supplemental gas chamber, a second orifice means spaced from the first orifice means and serving to establish flow restricting communication between the supplemental gas chamber and said inlet opening, said supplemental chamber having a substantial volume sufficient to serve as a pulsation absorbing chamber cooperable with said orifice means to minimize fluttering of the pallet.

5. In a relief valve, a body having inflow and outflow openings, a horizontally disposed valve seat formed within the body, a movable closure pallet cooperating with the valve seat and movable in a vertical direction between open and closed positions, a flexible fluid operated diaphragm connected to operate the pallet and having its periphery sealed with respect to the body, the body being formed to afford a closed gas chamber extending over the diaphragm, means forming a supplemental gas chamber on said pallet, orifice means establishing flow restricting communication between the first named gas chamber and said supplemental gas chamber, a second orifice means spaced from the first orifice means and serving to establish flow restricting communication between the supplemental gas chamber and said inlet opening, the spacing between said orifice means being a distance substantially greater than the effective diameter of either one of the same, said supplemental chamber having a substantial volume sufficient to serve as a pulsation absorbing chamber cooperable with said orifice means to minimize fluttering of the pallet.

6. In a relief valve, a body having inflow and outflow openings, a horizontally disposed valve seat formed within the body, a movable closure pallet cooperating with the valve seat, an annular flexible diaphragm connected to the periphery of the pallet and having its outer periphery sealed with respect to the body, the body being formed to afford a closed gas chamber extending over the pallet and the diaphragm, means forming a supplemental gas chamber on said pallet, orifice means establishing flow restricting communication between the first named gas chamber and the supplemental gas chamber, a second orifice means serving to establish flow restricting communication between the supplemental gas chamber and the inlet opening, said supplemental chamber having a substantial volume sufficient to serve as a pulsation absorbing chamber cooperable with said orifice means to minimize fluttering of the pallet.

7. A relief valve as defined in claim 4 in which the second orifice means is larger than the orifice means establishing flow restriction between the gas chamber above the diaphragm and the supplemental gas chamber.

ALBERT E. JURS.